Patented Apr. 29, 1947

2,419,930

UNITED STATES PATENT OFFICE 2,419,930

PROCESS FOR CLARIFYING LIQUIDS

Clarence Walter Wilson, Norco, Calif., assignor to California Fruit Growers Exchange, Los Angeles, Calif., a corporation of California No Drawing. Application February 16, 1942, Serial No. 431,105

6 Claims. (Cl. 99—105)

1

This is an invention concerning the removal of suspended insoluble solids and certain dissolved materials from liquids, either for the purpose of clarification of the liquid or for recovery of the materials.

A difficulty encountered in many arts, for example, paper making, sugar manufacture, wine making, and preparation of fruit juices, is that insoluble solids of various kinds must be removed or recovered from aqueous solutions. These solids are often of such a nature that they may not economically be removed by the common processes of filtration, centrifugation, etc.

I have found that solids of many kinds may be precipitated or flocculated from liquids by forming in the liquid a gel of an insoluble pectate, and accordingly I will proceed to disclose specific examples of the application of this process to various liquids found in industry.

My Patent No. Re 21,077 describes the preparation, from pectinous source materials, of soluble porous pectates of the alkali metals and ammonium. Briefly, the process involves an alkali treatment of the pectinous source material, then extraction of the pectate from the residue. For the present process, either the crude pectated pulp or the purified, extracted pectate may be used, as disclosed. Also, the better known nonfibrous pectates are useful, though less effective.

As an example of the practice of my invention, I give the following:

To 1 liter of juice obtained from sugar cane is added 0.4 g. of sodium pectate pulp, made and dispersed in accordance with the disclosure of Patent No. Re. 21,077. The pulp dispersion is well mixed with the liquid and allowed to stand. Calcium ions naturally present in the juice react with the pectate, and under the conditions obtaining, the calcium pectate may form as a coextensive gel, which soon flocculates and precipitates. The gel may or may not be detectable, and in some cases the first visible manifestation will be the formation of the flocculent precipitate. I use the term gel to include jellies as well as gelatinous precipitates. Formation of the flocculent precipitate is believed to be due to syneresis of the jelly first formed more or less throughout the liquid. Suspended solids of the juice are enmeshed in the precipitate and dragged down thereby. Efficiency of the process in carrying out suspended solids is conceived to be related to the degree to which the jelly forms coextensively with the whole body of liquid. The insoluble residue of the pectate pulp also precipitates, and the net result is that the sugar cane juice is bright and clean, and those colloidally dispersed substances referred to as gums are also much reduced.

In the preparation of some fruit or vegetable juices or their concentrates, it is desirable to get rid of materials which are or may become insoluble, and thus obtain a permanently clear product. In citrus juices, for example, there may be rather coarse suspended solids, in addition to a cloud which may persist indefinitely, if not removed. The orange juice treated as described below was coarsely screened, and contained cloud and visible suspended particles.

|  | Parts |
|---|---|
| Orange juice | 315 |
| Sugar syrup, 13° Brix | 582 |
| Sodium pectate, 5% sol | 49 |
| Total | 946 |

The orange juice and syrup were mixed, then the pectate sol added with stirring. The formation of large flocs occurred promptly, and these flocs settled out overnight, leaving a clear, supernatant juice product.

In the above case, sufficient calcium was present in the juice to react with the pectate. A juice deficient in calcium was treated by supplying the calcium, as follows:

Orange juice was first treated by dilution with twice its volume of water. To this dilute juice was added a small amount of a sol of purified sodium pectate. No jellying or flocculation was observed. To a second sample of the dilute juice was added a small quantity of calcium chloride. When the pectate sol was added to this mixture, there formed a jelly which rapidly precipitated, carrying down all suspended matters.

In the illustrations dealing with the clarification of orange juice, the concentration of pectate is on the order of 0.25%. I have observed good results with pectate added in such amounts as 0.03% and 0.30%, based on weight of pectate to weight of treated solution. These values are not limits, but are illustrative of adequate commercial practice. Optimum values, of course, vary with the liquid being treated.

Another variable is found in the amount of precipitating cation found in or added to the liquid. Calcium forms about 5.5% of calcium pectate. Best results probably are found when the cation is in the neighborhood of combining proportions with the pectate. Results of the process can be controlled by suitable modification of conditions such as temperature, agitation, strength, and quantity of the pectate sol used, and acidity of the solution to be clarified. An excess of soluble pectate will allow a portion of the sol to remain in the treated liquid. This may tend to colloidally protect the system and interfere with efficient precipitation. Large excesses of either pectate or cation should be avoided where the highest degree of clarity in the liquid is desired, but is not particularly important in other applications, such as the treatment of white water where the main object is recovery of the main part of the solids, with clarity of the liquid a secondary consideration.

Another illustrative use of my process is in the recovery of fiber, fillers, etc., from the white water which is generally a waste product from paper manufacture.

One part of a 2.5% dispersion of pectate pulp causes rapid and substantially complete precipitation of the solids suspended in 300 parts of white water from an ordinary paper-making process. These solids are generally lost because they are filtrable only with difficulty and do not naturally settle out rapidly enough to make it economical to treat the large volumes of liquid which are involved. After precipitation, the liquid may be separated from the solids in any desired manner, e. g. by use of the widely known Dorr thickener.

In the beer- and wine-making industries, substances such as silicic acid and albumen are used for "fining." Pectates may be used here with excellent results. They may also be used for clarification of apple and grape juices. Apple juice particularly is most attractive to the consumer when bright and clear. Pectates, originating as they do in fruits and vegetables, cannot be considered foreign to food products of this type, as are some agents now widely used.

The pectate gel will ordinarily be one of calcium pectate, since calcium salts are universally contained in natural products of the kind under consideration. Furthermore, calcium salts are non-poisonous. Other polyvalent metals will cause precipitation of gels from sols of pectates, and may be used in my process as is calcium, if desired. This is particularly true in non-food applications of my process. With regard to the treatment of white water, electrolytes of various metals may normally be present and take part in the precipitating reaction.

The principle of the invention involves the formation in the liquid to be clarified of an insoluble metal pectate under conditions such that the pectate will form substantially throughout the liquid as a gel which will rather quickly precipitate, carrying down (or up as the case may be) suspended solids. The nature of the precipitate and thoroughness of precipitation may be affected by the concentration of pectate in the sol, and the quantity of sol added. I have used sols containing pectate in proportions ranging from 2% to 11%.

Agitation also affects results. Where utmost efficiency is wanted, the pectate should be thoroughly dispersed in the liquid under treatment before the precipitating reaction occurs.

In the above description, and in the appended claims, it will be obvious from what has been said above that when pectate sols are referred to, those sols are aqueous in character.

Having disclosed my invention, I claim:

1. A process for the clarification of liquids containing suspended solids and calcium ions which comprises adding thereto a sol of a pectate of the group consisting of the alkali metals and ammonium, and subsequently separating the flocculated solids from the liquid.

2. A process for clarifying plant juices containing suspended solids comprising mixing a sol of a soluble pectate with the juice, and allowing the mixture to stand for a time to permit the formation of insoluble pectates.

3. A process for clarifying fruit juices containing suspended solids comprising mixing a sol of a pectate from the group consisting of alkali metal and ammonium with the fruit juice, and allowing the mixture to stand for a time to permit the formation of insoluble pectates.

4. A process for clarifying sugar juice containing suspended solids comprising mixing a sol of a pectate from the group consisting of alkali metal and ammonium with the sugar juice, and allowing the mixture to stand for a time sufficient to permit the formation of insoluble pectates and removing the flocculated solids from the liquid.

5. A process for the recovery of suspended solids from white water comprising intimately mixing a sol of a soluble pectate in the white water in an amount sufficient to form an insoluble pectate gel in combination with electrolytes present in the white water, thereby causing flocculation of the suspended solids, and removing the flocculated solids from the white water.

6. A process for the recovery of suspended solids from liquids containing the same, comprising intimately mixing a sol of a soluble pectate in the liquid in an amount sufficient to form an insoluble pectate gel coextensive with the liquid, thereby causing flocculation of the suspended solids, and removing the flocculated solids from the liquid.

CLARENCE WALTER WILSON.

REFERENCES CITED

The following references are of record in the file of this patent:

UNITED STATES PATENTS

| Number | Name | Date |
| --- | --- | --- |
| 979,482 | Hardman | Dec. 27, 1910 |
| 1,443,454 | Booth | Jan. 30, 1923 |
| 2,020,572 | Platt | Nov. 12, 1935 |
| 2,218,053 | Schwabe et al. | Oct. 15, 1940 |
| 2,132,064 | Wilson | Oct. 4, 1938 |
| 2,069,766 | Le Compte | Feb. 9, 1937 |
| 1,838,949 | Leo | Dec. 29, 1931 |

FOREIGN PATENTS

| Number | Country | Date |
| --- | --- | --- |
| 1,510 | British | 1853 |

OTHER REFERENCES

Geerligs, "Cane Sugar and Its Mfg.," 2nd ed., London, 1924, page 163.

McIntosh, "Technology of Sugar," London, 1916, page 99.

"Citrus Pectates—Properties, Manufacture, and Uses," by W. E. Baier and C. W. Wilson, pub. in Industrial and Eng. Chemistry, March 1941; pages 287 to 291.